(12) United States Patent
Qvarfordt

(10) Patent No.: US 9,384,420 B2
(45) Date of Patent: *Jul. 5, 2016

(54) CLASSIFYING USER ACTIVITIES USING EYE FIXATION CLUSTERING, FIXATION FEATURES, AND REGIONS OF INTEREST

(71) Applicant: FUJI XEROX CO., LTD., Tokyo (JP)

(72) Inventor: Pernilla Qvarfordt, Los Altos, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,161

(22) Filed: Jan. 13, 2016

(65) Prior Publication Data

US 2016/0132752 A1    May 12, 2016

Related U.S. Application Data

(63) Continuation of application No. 14/078,458, filed on Nov. 12, 2013, now Pat. No. 9,256,785.

(51) Int. Cl.
*G06K 9/00* (2006.01)
*G06K 9/62* (2006.01)
*G06T 7/00* (2006.01)

(52) U.S. Cl.
CPC .......... *G06K 9/6218* (2013.01); *G06K 9/00604* (2013.01); *G06K 9/00617* (2013.01); *G06K 9/6215* (2013.01); *G06T 7/0044* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 6,556,224 B1* | 4/2003 | Banno | G08B 5/225 715/817 |
| 7,533,411 B2 | 5/2009 | Goodman et al. | |
| 2005/0229251 A1 | 10/2005 | Chellapilla et al. | |
| 2008/0066014 A1* | 3/2008 | Misra | G06F 21/36 715/846 |
| 2011/0066014 A1* | 3/2011 | Bechtel | A61B 5/0059 600/323 |
| 2011/0206283 A1 | 8/2011 | Quarfordt et al. | |
| 2011/0310006 A1 | 12/2011 | Edwards et al. | |
| 2013/0177296 A1* | 7/2013 | Geisner | H04N 9/80 386/241 |

(Continued)

OTHER PUBLICATIONS

Biedert, A Robust Realtime Reading-Skimming Classifier, German Research Center for Artificial Intelligence, Mar. 28-30, 2012, 8 pgs.

(Continued)

*Primary Examiner* — Nancy Bitar
(74) *Attorney, Agent, or Firm* — Morgan, Lewis & Bockius LLP

(57) ABSTRACT

A computing device classifies user activities. The device receives eye tracking data for a person viewing a page having multiple contiguous regions. The eye tracking data comprises a temporal sequence of fixations, where each fixation has a duration and a location. The device partitions the fixations into clusters, where each cluster has a consecutive sub-sequence of the fixations. The device assigns a provisional user activity label to each fixation based on a set of characteristics of the fixation. The device also groups together consecutive fixations that have the same label to partition the fixations into groups. For each group that matches a respective cluster, the device retains the provisional label assignment as a final user activity label assigned to each of the fixations in the respective group. The device also reconciles non-matching groups with non-matching clusters, using the regions, to form a set of non-overlapping modified groups.

20 Claims, 14 Drawing Sheets

(56) References Cited

U.S. PATENT DOCUMENTS

2014/0168243 A1* 6/2014 Huang ..................... G06T 1/20
 345/522
2015/0131850 A1* 5/2015 Qvarfordt .......... G06K 9/00617
 382/103

OTHER PUBLICATIONS

Bulling, EyeContext: Recognition of High-Level Contextual Cues from Human Visual Behaviour, Apr. 27-May 2, 2013, 4 pgs.
Bulling, Eye Movement Analysis for Activity Recognition Using Electrooculography, IEEE Transactions on Pattern Analysis and Machine Intelligence, vol. 33, No. 4, Apr. 2011, 13 pgs.
Buscher, Eye Movements as Implicit Relevance Feedback, CHI 2008 Proceedings—Works in Progress, Apr. 5-10, 2008, 6 pgs.
Campbell, A Robust Algorithm for Reading Detection, IBM Almaden Research Center, 2001, 7 pgs.
IQBAL, Using Eye Gaze Patterns to Identify User Tasks, Department of Computer Science, 2004, 6 pgs.
Kardan, Comparing and Combining Eye Gaze and Interface Actions for Determining User Learning with an Interactive Simulation, Department of Computer Science, University of British Columbia, 2013, 13 pgs.
Krause, Classifying the Difference in Gaze Patterns of Alphabetic and Logographic L1 Readers—A Neural Network Approach, Cognitive Interaction Technology, Center of Excellence Bielefield University, 2011, 6 pgs.
Lopresti, Daniel, "Leveraging the CAPTCHA Problem," H.S. Baird and D.P. Lopresti (Eds.): HIP 2005, LNCS 3517, 14 pgs.
Qvarfordt, iBrowser API & Instructions, FX Palo Alto Laboratory, (no date available), 30 pgs.
Qvarfordt, Notice of Allowance, U.S. Appl. No. 14/078,458, Oct. 13, 2015, 17 pgs.
Salvucci, Identifying Fixations and Saccades in Eye-Tracking Protocols, Nissan Cambridge Basic Research Four Cambridge Center, 2000, 8 pgs.
Santella, Robust Clustering of Eye Movement Recordings for Quantification of Visual Interest, Department of Computer Science Center for Cognitive Science Rutgers University, In Eye Tracking Research and Applications (ETRA) Symposium 2004, 8 pgs.
Steichen, User-Adaptive Information Visualization-Using Eye Gaze Data to Infer Visualization Tasks and User Cognitive Abilities, Department of Computer Science University of British Columbia, Mar. 19-22, 2013, 12 pgs.
Tobii Studio, Comprehensive Eye Tracking Analysis and Visualization Software, (no date available), 8 pgs.

* cited by examiner

Cornea Reflection Eye Tracking

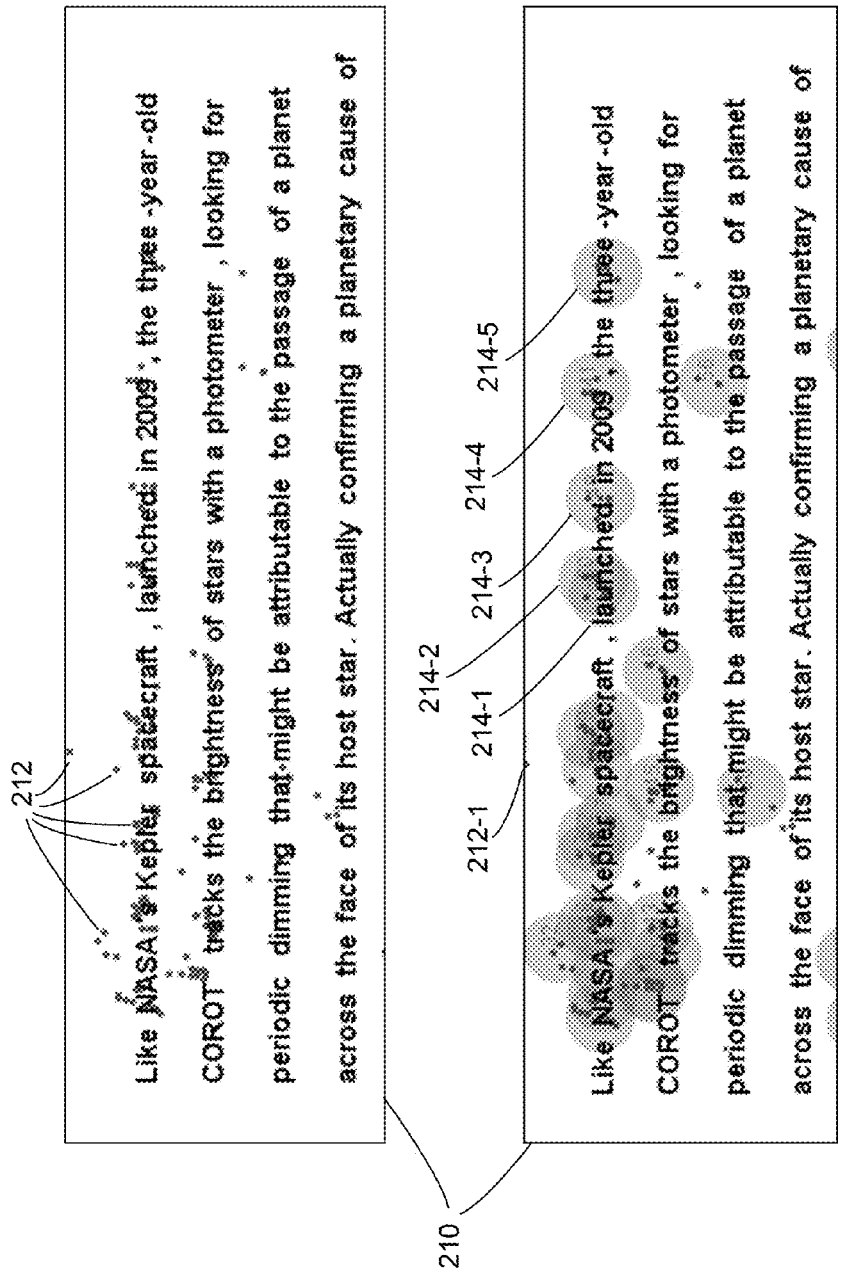
Figure 2C (Gaze Points)
Figure 2D (Fixations)

| Cluster | Region | activity | |
|---|---|---|---|
| 13 | Text 1-1 | reading | |
| 13 | Text 1-1 | reading | |
| 13 | Text 1-1 | reading | |
| 13 | Text 1-1 | reading | ⟵ 706 |
| 702 ⟶ 13 | Text 1-1 | ~~navigating~~ reading | |
| 13 | Text 1-1 | reading | ⟵ 704 |
| 13 | Text 1-1 | reading | |
| 14 | Img 1-2 | navigating | |

Figure 7A

| Cluster | Region | activity | |
|---|---|---|---|
| 23 | Text 1-5 | reading | |
| 23 | Text 1-5 | reading | |
| 23 | Text 1-5 | reading | |
| 23 | Text 1-5 | reading | |
| 712 — 23.1 ~~23~~ 710 | Link 1-5 | selecting | ⟵ 730 |
| 716 — 23.1 ~~23~~ | Link 1-5 | selecting | ⟵ 732 |
| — 23.2 ~~23~~ | Text 1-6 | navigating | ⟵ 734 |
| 24 | Img 1-6 | inspecting | |
| 714 | | | |

Figure 7B

| Cluster | Region | activity | |
|---|---|---|---|
| 13 | Text 1-1 | reading | 750 |
| 13 | Text 1-1 | reading | |
| 13 | Text 1-1 | reading | 752 |
| 13 | Text 1-1 | reading | |
| 13 | Text 1-1 | navigating | 754 |
| 13 | Text 1-1 | reading | 756 |
| 13 | Text 1-1 | reading | |
| 14 | Img 1-2 | navigating | |

Figure 7C

| Cluster | Region | activity | |
|---|---|---|---|
| 23 | Text 1-5 | reading | 760 |
| 23 | Text 1-5 | reading | |
| 23 | Text 1-5 | reading | 762 |
| 23 | Text 1-5 | reading | |
| 23 | Link 1-5 | selecting | 764 |
| 23 | Link 1-5 | selecting | |
| 23 | Text 1-6 | navigating | 766 |
| 24 | Img 1-6 | inspecting | |

858 — Reconcile non-matching groups with non-matching clusters, using the regions, to form a set of non-overlapping modified groups consisting of fixations from the non-matching groups (continued).

862 — Reconciling non-matching groups with non-matching clusters comprises:

864 — Identify a set of non-matching boundaries.

866 — Each boundary in the set of non-matching boundaries is either a boundary of a respective group but not a boundary of any respective cluster or a boundary of a respective cluster but not a boundary of any respective group.

868 — For each boundary in the set of non-matching boundaries:

870 — Compute a respective retention cost for keeping the boundary and compute a respective removal cost for removing the boundary.

872 — Boundary retention costs and boundary removal costs are based on a plurality of factors selected from: the sizes of resulting modified groups; fixation durations within resulting modified groups; the user activity labels assigned to fixations on both sides of a boundary; regions corresponding to fixations on both sides of a boundary; and the sizes of the regions.

874 — Keep or remove the boundary based on the lowest cost alternative.

876 — Identify the set of modified groups based on the boundaries kept from the set of non-matching boundaries.

878 — Assign a final user activity label to the fixations in each modified group based on the most prevalent user activity label assigned to the fixations in the respective modified group.

880 — Analyze the fixations and their associated user activity labels to make one or more recommendations for modifying the computer user interface.

CLASSIFYING USER ACTIVITIES USING EYE FIXATION CLUSTERING, FIXATION FEATURES, AND REGIONS OF INTEREST

CROSS REFERENCE TO RELATED APPLICATIONS

This application is a continuation of U.S. patent application Ser. No. 14/078,458, filed Nov. 12, 2013, entitled "Identifying User Activities Using Eye Tracking Data, Mouse Events, and Keystrokes," which is incorporated by reference herein in its entirety.

TECHNICAL FIELD

The disclosed implementations relate generally to eye tracking, and more specifically to classifying user activity based on eye tracking data.

BACKGROUND

When a user interacts with a user interface or reads a printed page, the user is engaged in a range of activities, including reading, selecting, inspecting parts of an image, and so on. Some eye tracking technology can capture what a user pays attention to, or classify if a user is reading text. However, the classification processes are limited to text, and rely solely on eye movement. To get a more fine grained understanding of users' activities, a more detailed analysis is required.

One problem with eye tracking data is that it includes a lot of random variation (i.e., noise). For this reason, current eye tracking techniques do not result in accurate data. For example, current techniques are not sufficiently reliable at detecting what a person is looking at or what a person is doing.

SUMMARY

The present application describes systems and methods for classifying and grouping fixations according to the activity the user is engaged in, such as reading text, looking at an image, typing on a keyboard, or interacting with a user interface component. In some implementations, the disclosed techniques provide detailed information about the user's activities while interacting with a computer interface. In some implementations, the disclosed techniques analyze eye tracking data for user research or for user interface design feedback, or to provide an intelligent user interface system with information about a user's attention. Some implementations use the disclosed techniques to evaluate the effectiveness of printed materials, such as marketing materials.

It is useful to understand the activities a user is involved with when interacting with user interfaces. This application describes systems and methods to categorize user activity utilizing eye tracking data and information collected from user input devices (e.g., a mouse and a keyboard). The classification techniques can be used directly, incorporated into software that analyzes eye tracking data for user research, or incorporated into an intelligent user interface system.

Print material and user interfaces often contain different kinds of information: text, figures, user interface controls, and so on. When examining these different kinds of information, a user's gaze exhibits different gaze patterns. These patterns can be identified and categorized. When combined with the regions created by the different information content, more precise estimation of a user's attention and activities can be achieved.

When evaluating information rich visual content (such as user interfaces, web pages, and electronic documents), regions of interest are often created, which are large enough to robustly measure a user's attention within the expected eye tracking errors. Smaller regions are often avoided because eye tracking errors can make it too difficult to correctly correlate a user's gaze to a region. In some existing systems, the regions of interest ("ROIs") are created by hand, but they can also be automatically derived from the content displayed (e.g., using the columns and rows of white space between regions). These regions may contain different kinds of information that are expected to elicit different gaze patterns. When ROIs are automatically generated they can be hierarchically nested with larger more general regions containing smaller more specific regions.

Used alone, keystrokes and mouse events are not good indicators of what a user pays attention to. In some cases, keystrokes and mouse events are not synchronized with a user's attention. For example, the user may position the mouse, continue to read a piece of text, then click on the mouse when ready, without looking at the button he or she selected. In another example, a user may "park" the mouse while reading text or inspecting a page, so information about the mouse provides no information about the user's activity. Because gaze data directly identifies where a person is looking, gaze data is generally better than keystrokes and mouse events at classifying user activities. In some implementations, 60 or more gaze points are collected per second. Disclosed implementations that supplement gaze data with keystrokes and mouse events can provide even better data.

The disclosed techniques can be used in software analyzing eye tracking data for user research, such as evaluating the effectiveness of print material or websites. This provides precise information about user activity as well as attention. For example, disclosed implementations can determine if a person is reading a piece of important information or just staring at the location of the information without reading it. The disclosed techniques provide valuable feedback for designers and usability experts regarding user activity and attention.

In some implementations, activity classification provides an intelligent user interface ("IUI") with detailed information about user activity. The classification can create recommendations about appropriate actions or information, or customize the user interaction to increase task efficiency. For example, if the system detects that a user is not reading an important instruction, it can alert the user to read it. Or, if the system detects a user reading text and inspecting images related to sales projections of product X, the system can suggest similar documents and text segments related to this topic. Some implementations use the disclosed techniques in a tutor system that detects inefficient behavior patterns and tries to guide users to more efficient methods of solving their particular tasks.

Eye movements can be classified into fixations, when the eye is relative still and the brain processes information, and saccades, when the eye moves from one fixation point to the next. Saccades are short in duration (e.g., less than 80 milliseconds) and fixations are longer, typically 250 milliseconds, but can be as short as 80-100 milliseconds. A fixation identification algorithm groups gaze data points (e.g., collected at a rate of 60 per second) into fixations and saccades. Each fixation has a duration and a location (e.g., the centroid of the gaze points in the fixation).

Fixations can be grouped and matched with regions according to the locations of the fixations, the user activity correlated to the fixations, and the content type of the regions. This creates a more precise analysis than using eye tracking data alone.

Implementations of the present invention can use any standard fixation identification algorithm. Two common categories of fixation detection algorithms are dispersion-based algorithms (which measure the spread of gaze points in a fixation) and velocity-based algorithms (which measure the velocity between gaze points). In both types of algorithms, there are threshold values that determine whether a fixation is detected (e.g., less than a threshold dispersion or less than a threshold velocity). For each fixation, the detection algorithm provides the location and duration for each fixation. Gaze data samples not belonging to fixations are generally discarded by fixation detection algorithms.

Some implementations of the present invention extend standard fixation detection algorithms to take into account gaze point segments that would not qualify as fixations under a standard algorithm. A quasi-fixation can be defined as a group of successive gaze data points not matching the criteria of the fixation detection algorithm and where the duration is too long to be a saccade. Many quasi-fixations contain more noise than would be acceptable for a regular fixation algorithm. However, a quasi-fixation may describe a smooth pursuit (e.g., when the eye follows motion, such as a moving dot on a display) or other informative event (such as added noise when a user is moving the mouse or typing).

Some implementations that keep quasi-fixations assign a "validity" to each gaze point segment. For example, each fixation has a validity of 1, whereas a quasi-fixation has a validity of 0. In some implementations, the validity is assigned on a continuum ranging from 0 (definitely invalid) to 1 (definitely valid). In some implementations, fixations with very low estimated validity are discarded anyway (e.g., validity less than 0.1 or validity less than 0.25). In these implementations, the extended algorithm keeps many more fixations than the standard algorithm, but still discards at some level.

To simplify the subsequent discussion, for implementations that use only true fixations, the term "fixation" refers to those fixations. For implementations that also include quasi-fixations, the term "fixation" will be broader, encompassing gaze point segments that are either true fixations or quasi-fixations. In some instances, the phrase "invalid fixation" is used to identify a quasi-fixation.

Implementations classify each fixation based on the activity being performed at the time of the fixation. This classification can be done heuristically or by using machine learning techniques. In either case, the system utilizes a model of fixation activity classes. For each fixation, a corresponding set of fixation features is determined, and the features are compared to the model. The set of features can include characteristics of the fixation itself (e.g., duration or validity estimate), fixation context (e.g., distance from prior and subsequent fixations), and information provided by user interface devices (e.g., keyboard and mouse events during or near the fixation). The best matching activity label is assigned to the fixation. Some implementations utilize the activity labels "inspecting" (looking at content with intent of understanding it), "reading," "navigation (searching for next piece of information to digest, or moving the attention to a different part of the UI, including mouse movements)," "navigating along path" (follow a graphical element pointing to a new location), "selecting," and "typing."

The activity classification typically includes activities that can be inferred from gaze. For example, if a user clicks a button while inspecting a piece of information elsewhere on the page, the activity label would be "inspecting." Some implementations include the activity label "scrolling," which corresponds to a user scrolling within a window (e.g., by dragging a scroll box or rolling a scroll wheel). Some implementations include "judging," which indicates a user is deciding on whether to perform an action or not. In some implementations, the activity classification uses a standard machine learning method, such as a support vector machine ("SVM") or a neural network.

After the activity classification, groups of consecutive fixations engaged in the same activity are created. These groups are created by inspecting the classified activity of two consecutive fixations. If they are the same they will be in the same group. Proceeding sequentially, as long as the activity label of the following fixations is the same, they will be included in the same group. If not, a new group will be created, and the process continues. The groups identify time periods when the user was engaged in a particular activity.

The activity groups created may not match the regions in the user interface or printed page well and there might be some misclassifications of activities. Some implementations include a parallel step that clusters the fixations based only on their locations and temporal order. In a later step, the clusters and groups are compared and reconciled.

Some implementations compute fixation clusters. A cluster includes consecutive fixations that are closely located. Typically, implementations require that the temporal order of the fixations is preserved. Some implementations allow for a "drift" in the fixation pattern. For example, when people read, the fixations will move with short distances from left to right without a clearly defined center point.

Some implementations construct the fixation clusters by sequentially processing the fixations in temporal order. In the first step, a cluster is formed that initially contains the first fixation. At each subsequent step, a new fixation is considered, and it is compared to the last fixation that was considered, and to the cluster that contains the last fixation. The new fixation will either be placed in the cluster that contains the last fixation, or the new fixation will start a new cluster. For example, if a person is reading a portion of text on a page, moves on to another region on the page, then jumps back to the first portion of text, the later fixations are not in the same cluster as the first fixations, even if they are at the same location on the page.

If the new fixation is within a first distance threshold of the last fixation, it gets added to the cluster. If not, the distance from the new fixation to each fixation in the cluster is calculated and if the smallest distance from the new fixation to a fixation in the cluster is less than a second threshold, the new fixation is added to the cluster. Otherwise, the new fixation begins a new cluster. In some implementations the first and second thresholds are the same.

Some implementations include a merge & match step, in which the activity groups and the fixation clusters are compared and reconciled. The activity groups and fixation clusters are considered as segment types. The boundaries of the two segment types are compared, and a cost is associated with keeping, substituting or eliminating each of the boundaries. The cost can be constructed based on a heuristic model or based on a model derived from machine learning algorithms. Costs can be based on many factors, including: segment sizes, number of segments, fixation durations within segments, activity types of surrounding segments, relative location of segments to regions on the page, the sizes of the relevant regions, and so on.

The configuration that minimizes the cost is retained. This may result in adjustments to the clusters or the activity groups. In some implementations, the entire configuration of groups and clusters is evaluated together. The configuration with the overall best results (e.g., lowest cost) is selected.

In other implementations, the reconciliation is performed sequentially, one boundary at a time. Each boundary is either retained or discarded according to a cost function or other heuristic, and the algorithm moves on to the next boundary.

Some implementations process more than one boundary at a time, but less than all boundaries. For example, some implementations identify all of the boundaries where there is agreement between the clusters and activity groups. Then, the reconciliation process is applied to all mismatched boundaries between closest pairs of matching boundaries.

Some sequences of activities can be a signs of high level activities that are not recognizable when looking at a single fixation. In some implementations, the sequences of activities are analyzed to find patterns indicative of higher level activities, and may be combined into even higher-level activities. For example, the activity of skimming a text consists of short periods of reading (e.g., 3-4 fixations) followed by a navigational fixation to a new part of the text and another short period of reading.

Some implementations use string mining techniques to identify possible higher level activities. Models of activities are stored and matched against the user activity label assignments computed earlier. By parsing the activity segments, matches can be generated. This analysis can be performed efficiently using stored examples of skimming or other higher-level activities. Some implementations determine matches not only using the sequence of activities, but also using the characteristics of the activities (or features of the fixations), such as duration. In addition to pre-computed activity sequences, some implementations automatically identify frequently occurring sequences.

In accordance with some implementations, a method classifies the user activities of a person interacting with a computer user interface with one or more user interface devices (e.g., a keyboard and a mouse). The method is performed at a computer system having one or more processors and memory. The computer system receives eye tracking data for the person. The eye tracking data includes a sequence of fixations ordered temporally, where each respective fixation corresponds to a plurality of respective consecutive measured gaze points. The fixations are identified from the raw gaze point data using a fixation detection algorithm. Each respective fixation has a respective duration and location based on the corresponding respective measured gaze points. For each fixation in the sequence, the computer system determines a plurality of features for the fixation. The features include one or more characteristics of the fixation, one or more context features based on preceding or subsequent fixations, and one or more user interaction features based on information from the user interface devices during the fixation or in close temporal proximity thereto. The computer system assigns a user activity label to the fixation in accordance with the plurality of features, where the user activity label is selected from a predefined set of user activity labels (e.g., inspecting, reading, navigating, selecting, and typing). Some implementations utilize machine learning to perform the assignments (e.g., a support vector machine (SVM) or a neural network). The computer system then analyzes the fixations and their assigned user activity labels to make one or more recommendations.

In accordance with some implementations, a method classifies user activities for a person viewing a page that contains a plurality of distinct contiguous regions (e.g., a printed page with multiple regions, or a web page or user interface window with multiple regions). The method is performed at a computer system having one or more processors and memory. The computer system receives eye tracking data (e.g., in the form of gaze points) for the person. From the eye tracking data a sequence of temporally ordered fixations can be detected. The fixations are identified from the raw gaze point data using a fixation detection algorithm. Each respective fixation has a respective duration and location based on the corresponding respective measured gaze points. The computer system partitions the fixations into a plurality of clusters, where each cluster comprises a consecutive sub-sequence of the fixations in the temporal order. In addition, the computer system assigns a provisional user activity label to each fixation based on a set of features or characteristics of the fixation (e.g., characteristics of the fixations themselves, features describing the context of each fixation, and features indicating the status of one or more user interface devices during the fixation). The user activity labels are selected from a predefined set of user activity labels (e.g., inspecting, reading, selecting, typing, navigating, and path navigating). The computer system groups together consecutive fixations that have the same assigned provisional user activity label to partition the fixations into a plurality of groups. For each respective group that matches a respective cluster, the computer system retains the provisional user activity label assignment as a final user activity label assigned to each of the fixations in the respective group. The computer system also reconciles the non-matching groups with the non-matching clusters, using the regions, to form a set of non-overlapping modified groups consisting of fixations from the non-matching groups. Each fixation in a modified group is assigned the same final user activity label, which is selected from the predefined set of user activity labels. The computer system then analyzes the fixations and their assigned final user activity labels to make one or more recommendations.

BRIEF DESCRIPTION OF THE DRAWINGS

FIGS. 2C and 2D illustrate a process for detecting eye fixations in accordance with some implementations.

FIGS. 7A-7D provide examples of how fixation clusters are reconciled with fixation groups in accordance with some implementations.

FIGS. 8A-8D illustrate a process for classifying fixations in accordance with some implementations.

Like reference numerals refer to corresponding parts throughout the drawings.

DESCRIPTION OF IMPLEMENTATIONS

Figure 1A:
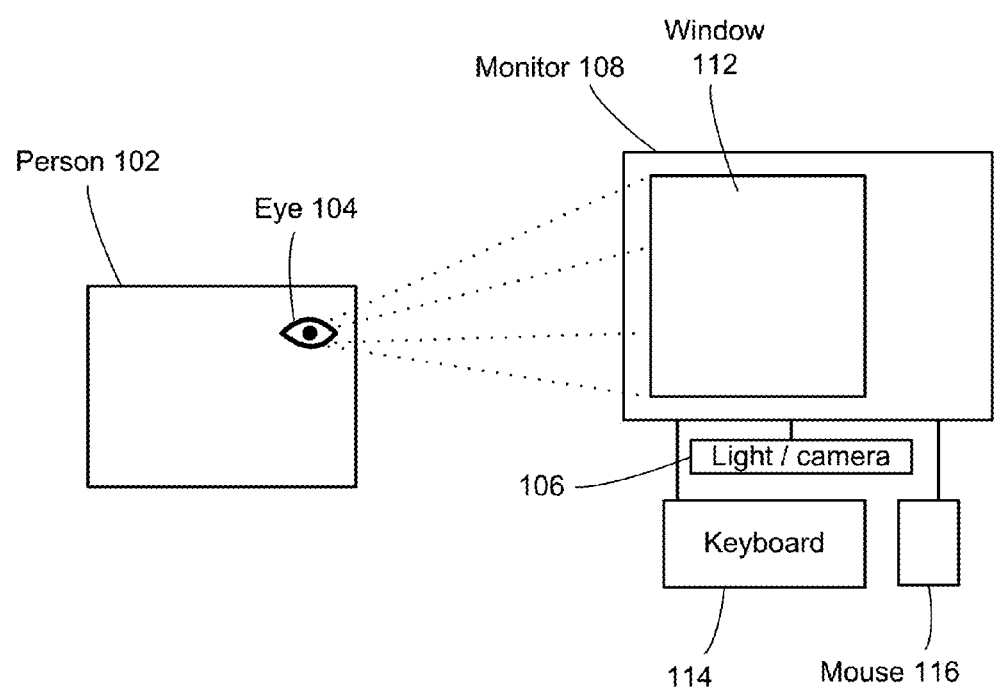
FIGS. 1A and 1B illustrate contexts in which some implementations of the present invention operate.

FIG. 1A illustrates a context in which some implementations of the present invention operate. In FIG. 1, a user 102 is interacting with a computer user interface 112 displayed on a computer monitor 108. The person 102 sees the user interface 112 with his eyes 104, and interacts with the user interface 112 using one or more user interface devices, such as a keyboard 114 and a mouse 116. To track the eye movements of the user 102, various eye tracking devices may be used. For example, some implementations include a combination infrared camera and light 106, which may be mounted to the computer monitor 108. Some implementations utilize a camera 106 without an infrared light. Typically the camera is mounted to the bottom of the monitor to get the best possible eye view. Some implementations utilize a separate camera 106 and infrared light, but they are generally in close proximity for optimal eye tracking accuracy.

Figure 1B:
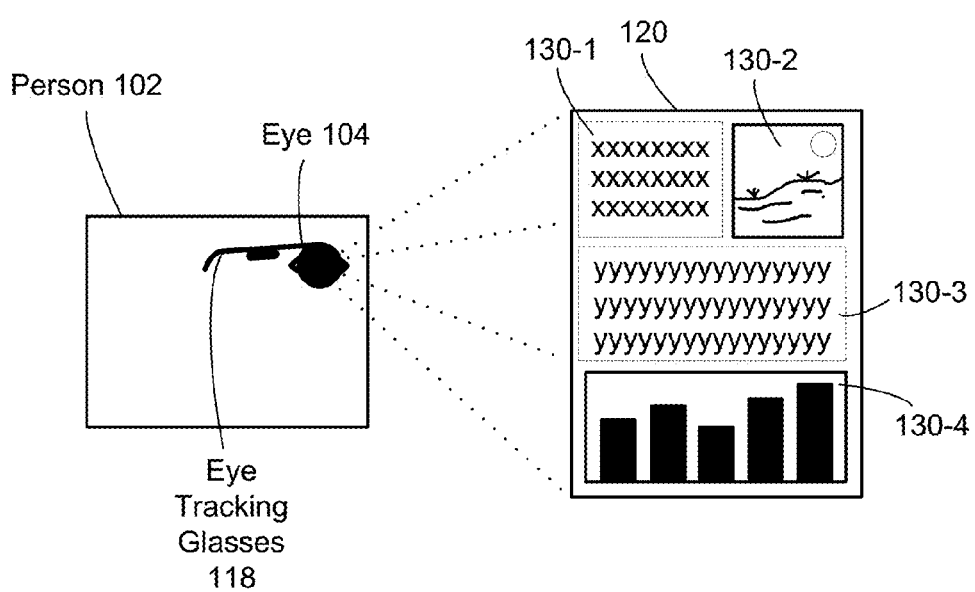

FIG. 1B illustrates another context in which some implementations of the present invention operate. In this implementation, the user 102 is viewing a printed page 120, which is not displayed on a computer monitor 108. In this implementation, the user is wearing a special pair of glasses 118, which include one or more digital image sensors to track eye movements. In some implementations, the glasses 118 are a computing device, which perform the classification tasks as described below. In other implementations, the glasses 118 collect the data, but transmit the data to a separate computing device (e.g., over a Wifi connection). In some implementations, the glasses include an infrared light, which is used to track eye movement. Examples of eye tracking glasses include the Tobii Glasses Eye Tracker by Tobii™. The printed page 120 includes a plurality of distinct regions 130, including text regions 130-1 and 130-3, and images regions 130-2 and 130-4.

There are many different technologies used in eye tracking, and the techniques disclosed herein do not rely on any specific eye tracking technique. One of the techniques for eye tracking uses corneal reflection of infrared light, as illustrated in FIGS. 2A, 2B, and 2E.

Figure 2A:
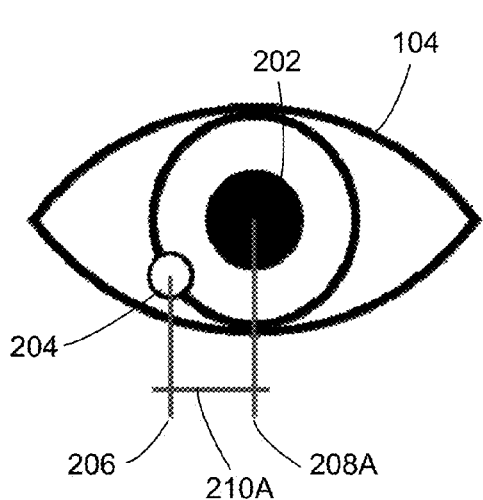
FIGS. 2A, 2B, and 2E illustrate one method for determining eye fixations, which is used by some implementations.
Figure 2B:
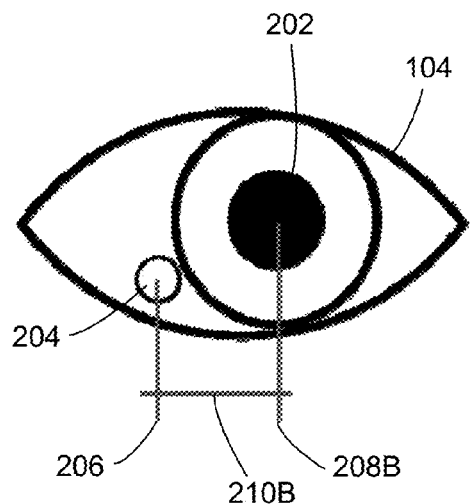
Figure 2E:
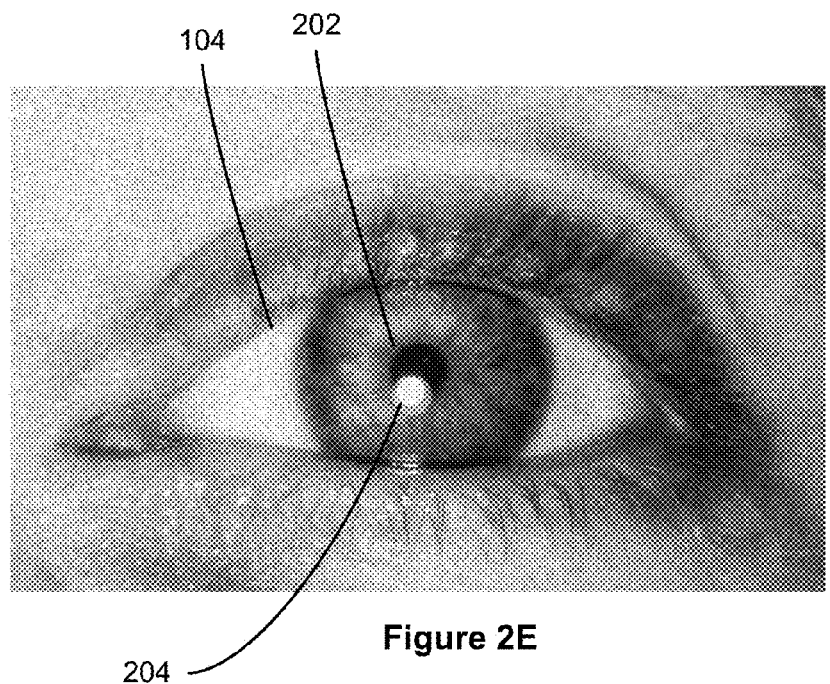

FIGS. 2A and 2B show the same eye 104 schematically, including the glint 204 and the pupil 202. In FIG. 2A, the eye tracking device has identified the horizontal glint location 206 and the horizontal pupil location 208A, and thus can compute the pupil offset 210A. In FIG. 2B, the glint 204 has the same horizontal glint location 206, but the horizontal pupil location 208B has changed. The new pupil offset 210B is greater than the offset 210A in FIG. 2A. By comparing the new offset 210B to the original offset 210A, the device is able to track where the eye 104 is looking. The same technique can be applied to vertical offsets as well (not shown). FIG. 2E shows the same eye 104, pupil 202, and glint 204 for an actual person.

FIG. 2C illustrates the raw data collected by an eye tracking device. A person 102 is reading text in a portion 210 of a region 442, which may be on a printed page 120 or a user interface page 112. The eye tracking device identifies the instantaneous gaze points 212, typically taking measurements at a fixed frequency (e.g., 60 gaze points per second).

A person's gaze may be divided into fixations, which are time periods where the eye remains relatively still, and saccades, which are the time periods between fixations, where the eye is moving more rapidly. Based on empirical data, fixations are typically longer than saccades. A fixation is typically about 250 milliseconds, with a minimum duration of 80-100 milliseconds, whereas a saccade is typically less than 80 milliseconds.

A fixation detection algorithm takes the gaze points 212, and determines the fixations 214, as illustrated in FIG. 2D. In this figure, five of the fixations 214-1, 214-2, 214-3, 214-4, and 214-5 are labeled. Note that not all gaze points 212 are assigned to fixations 214. For example, gaze point 212-1 in FIG. 2D is not assigned to any fixation. Of course the gaze points within a fixation are consecutive in time. The algorithms for identifying fixations are typically either dispersion based (i.e., the gaze points within a fixation cannot be dispersed too far) or velocity based (i.e., the velocity between consecutive gaze points cannot be too high). Both of these techniques can lead to discarding some data when the gaze points do not meet the thresholds used for dispersion or velocity.

Figure 3:
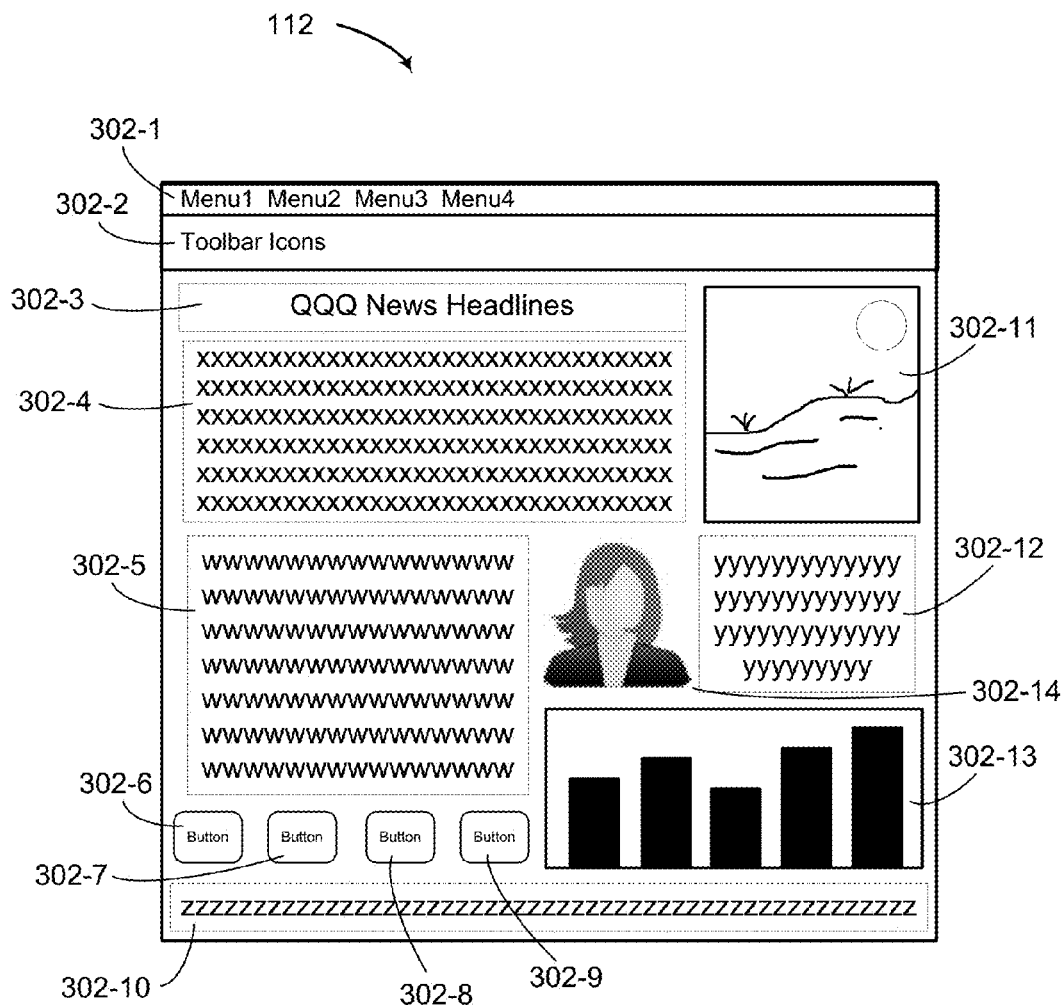
FIG. 3 illustrates regions within a computer user interface in accordance with some implementations.

FIG. 3 illustrates regions 302 within a user interface window or web page 112. In this window 112 there is a menu bar 302-1 and a toolbar 302-2, which typically includes small graphical icons to perform certain tasks (e.g., a "save" icon or a "print" icon). In addition, there is a title region 302-3, a series of button regions 302-6, 302-7, 302-8, and 302-9. Most windows include text regions, such as regions 302-4, 302-5, 302-10, and 302-12. A user interface window 112 commonly includes images regions as well, such as regions 302-11, 302-13, and 302-14. The regions 302 may be identified manually or using computer algorithms.

Figure 4:
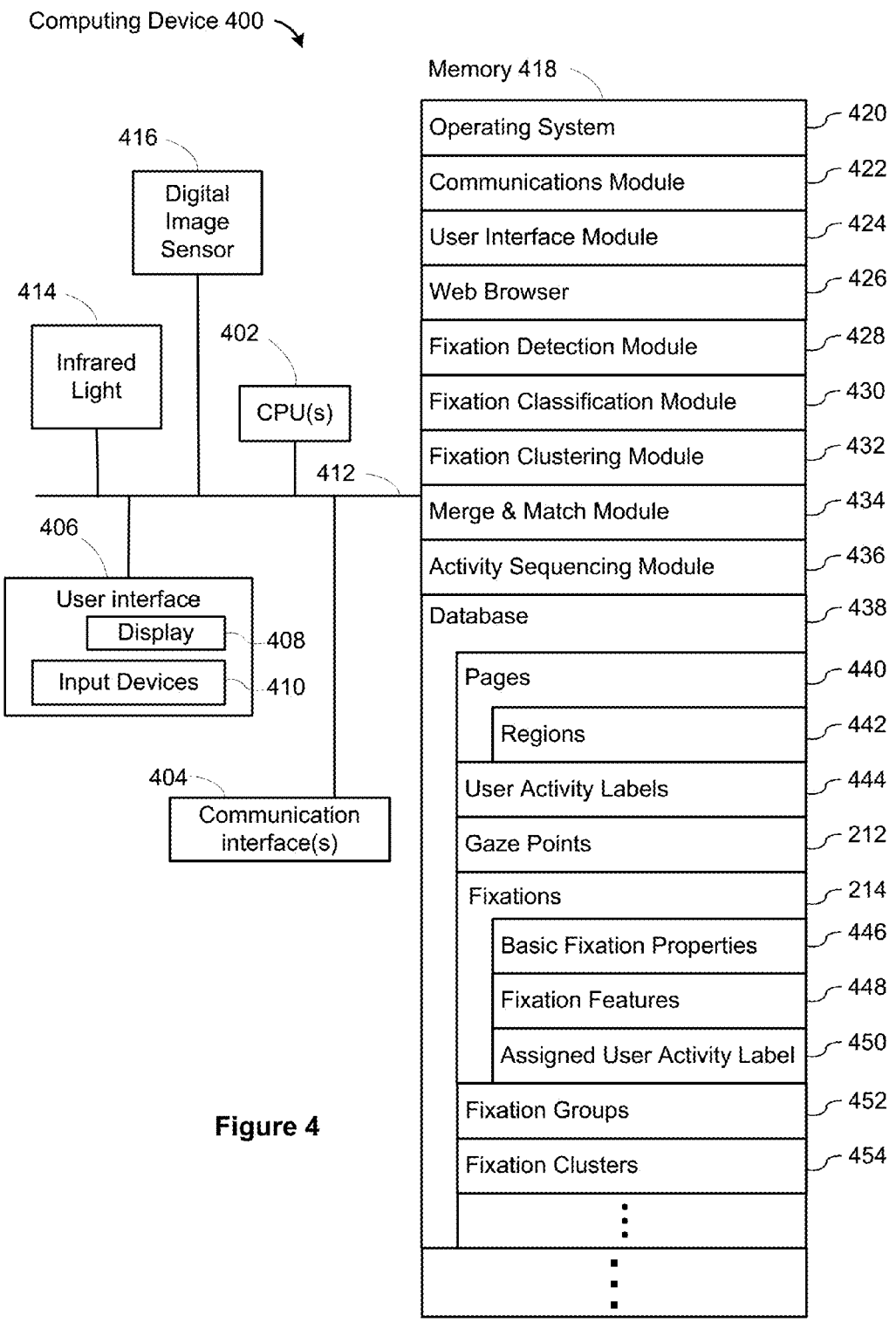
FIG. 4 is a block diagram illustrating a computing device in accordance with some implementations.

FIG. 4 is a block diagram illustrating a computing device 400, according to some implementations. The computing device 400 can be a desktop computer, a laptop computer, a mobile device that has a digital image sensor 416, or a server computer that has access to fixation data (or raw gaze data) collected from a remote sensor. The computing device 400 typically includes one or more processing units (CPU's) 402, one or more network or other communications interfaces 404, memory 418, and one or more communication buses 412 for interconnecting these components. The communication buses 412 may include circuitry (sometimes called a chipset) that interconnects and controls communications between system components. The computing device 400 may include a user interface 406 comprising a display device 408 (e.g., a display screen 108) and input devices/mechanisms 410 (e.g., keyboard 114, mouse 116, touch screen, physical buttons, etc.). In some implementations, the computing device 400 includes an infrared light 414, which is used to track eye movements. The computing device also includes a digital image sensor 416, which is used to capture images of a user's eye 104. In some implementations, the digital image sensor 416 takes images in the infrared range, but in other implementations, the digital image sensor 416 takes images in the visible portion of the spectrum. In some implementations, the infrared light 414 and/or digital image sensor 416 are remote from the computing device 400.

Memory 418 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 418 may optionally include one or more storage devices remotely located from the CPU(s) 402. Memory 418, or alternately the non-volatile memory device(s) within memory 418, comprises a computer readable storage medium. In some implementations, memory 418 stores the following programs, modules and data structures, or a subset thereof:

an operating system 420 that includes procedures for handling various basic system services and for performing hardware dependent tasks;

a communication module 422 that is used for connecting the computing device 400 to other computer systems via the one or more communication interfaces 404 (wired or wireless) and one or more communication networks, such as the Internet, other wide area networks, local area networks, metropolitan area networks, and so on;

a user interface module 424 that receives commands from the user via the input devices 410 and generates user interface objects in the display device 408;

a web browser 426 that enables a user to access resources, web pages, and web applications over a communication network;

a fixation detection module 428, which takes a set of gaze points 212 (as illustrated in FIG. 2C, and identifies a set of fixations 214 (as illustrated in FIG. 2D). The fixation detection module typically uses a dispersion algorithm or a velocity algorithm. In some implementations, a basic fixation detection algorithm is extended to output a validity measure associated with each fixation. In some of these implementations, the extended fixation detection algorithm outputs a greater number of "fixations" because the quasi-fixations are included as well as true fixations;

a fixation classification module 430, which is described in greater detail below with respect to FIGS. 5 and 8A-8C;

a fixation clustering module 432, which is described in more detail below with respect to FIGS. 6 and 9A-9C;

a merge & match module 434, which combines the clusters 454 determined by the fixation clustering module 432 with the fixation groups 452 determined by the fixation classification module 430. The merge & match module 434 utilizes the regions 442 to help reconcile the mismatches between the fixation clusters 454 and the fixation groups 452. The merge & match module is described in more detail below with respect to FIGS. 6, 7A-7D, and 9A-9C;

an activity sequencing module 436, which uses the reconciled activity classifications, and identifies higher level activities based on longer patterns of lower level user activities (e.g., identifying a user skimming the text in a region 442 based on short stints of reading interspersed with movements to other portions of text in the region). The activity sequencing module is described in greater detail below with respect to FIGS. 6 and 9A-9C;

one or more databases 438, which store data used by the software modules 428, 430, 432, 434, and 436;

the database 438 stores information about one or more pages 440, which includes printed pages 120, web pages 112, user interface windows 112, or other pages that are viewed by a user 102;

each of the pages 440 includes one or more regions 442, and information about the regions 442 is stored in the database 438. The regions 442 are logical subdivisions of a page 440 into contiguous non-overlapping portions, such as the regions 130 on a printed page 120 (illustrated in FIG. 1B) or the regions 302 in a user interface window 112 (illustrated in FIG. 3). Regions 442 are commonly rectangular, but that shape is not required. The regions 442 are sometimes referred to as regions of interest or ROI;

the database 438 stores a predefined set of user activity labels 444, and information associated with those labels 444. In some implementations, the predefined set of user activity labels 444 includes "inspecting," "reading," "navigating," "typing," and "selecting." These are sometimes referred to as low level activities because they describe what is occurring during an individual fixation. (The activity sequencing module 436 assigns high-level user activities to sequences of fixations.) The assignment of user activity labels 444 to individual fixations is described in more detail below with respect to FIGS. 5 and 8A-8C;

the database 438 stores the gaze points 212 that are used by the fixation detection module 428 to identify fixations 214;

the database 438 stores the fixations 214 that were determined by the fixation detection module 428. The database 438 also stores some basic fixation properties 446 associated with each fixation 214, including the duration of the fixation, the location of the fixation (e.g., centroid of the gaze points that make up the fixation), and the validity of the fixation;

the database 438 stores a set of fixation fixtures 448 corresponding to each fixation 214. As explained in greater detail with respect to FIGS. 5 and 8A-8C, the fixation features may be inherent characteristics of the fixation 214 (e.g., duration), may be computed based on other preceding or subsequent fixations (e.g., duration of recent or subsequent fixations), or may identify user interactions related to the fixation (e.g., was the mouse button pressed during the fixation). FIGS. 5 and 8A-8C indicate how the features are used to assign a user activity label 444 to the fixations 214;

the database 438 stores the assigned user activity label 450 for each of the fixations 214, as determined by the fixation classification module 430;

the database 438 stores the fixation groups 452, which are based on the assigned user activity labels 450. The determination of the fixation groups 452 is described in more detail below with respect to FIGS. 6 and 9A-9C; and the database stores the fixation clusters 454, which are determined by the fixation clustering module 432. The fixation clusters are described in more detail below with respect to FIGS. 6 and 9A-9C.

Each of the above identified elements may be stored in one or more of the previously mentioned memory devices, and corresponds to a set of instructions for performing a function described above. The set of instructions can be executed by one or more processors (e.g., the CPU's 402). The above identified modules or programs (i.e., sets of instructions) need not be implemented as separate software programs, procedures or modules, and thus various subsets of these modules may be combined or otherwise re-arranged in various implementations. In some implementations, memory 418 may store a subset of the modules and data structures identified above. Furthermore, memory 418 may store additional modules and data structures not described above.

Although FIG. 4 shows a computing device 400, FIG. 4 is intended more as a functional description of the various features that may be present in one or more computing devices than as a structural schematic of the implementations described herein. In practice, and as recognized by those of ordinary skill in the art, items shown separately could be combined and some items could be separated. For example, all of the data and processing may occur on a single device 400 (e.g., a user's own computer), or the processing may be split between two or more computing devices 400 (e.g., a user device that operates primarily to collect raw data and a back-end server that does the analysis of the fixations).

Each of the methods described herein may be governed by instructions that are stored in a computer readable storage medium and that are executed by one or more processors of computing device 400. Each of the operations shown in the figures (e.g., FIGS. 5, 6, 8A-8C, and 9A-9C) may correspond to instructions stored in a computer memory or computer readable storage medium.

Figure 5:
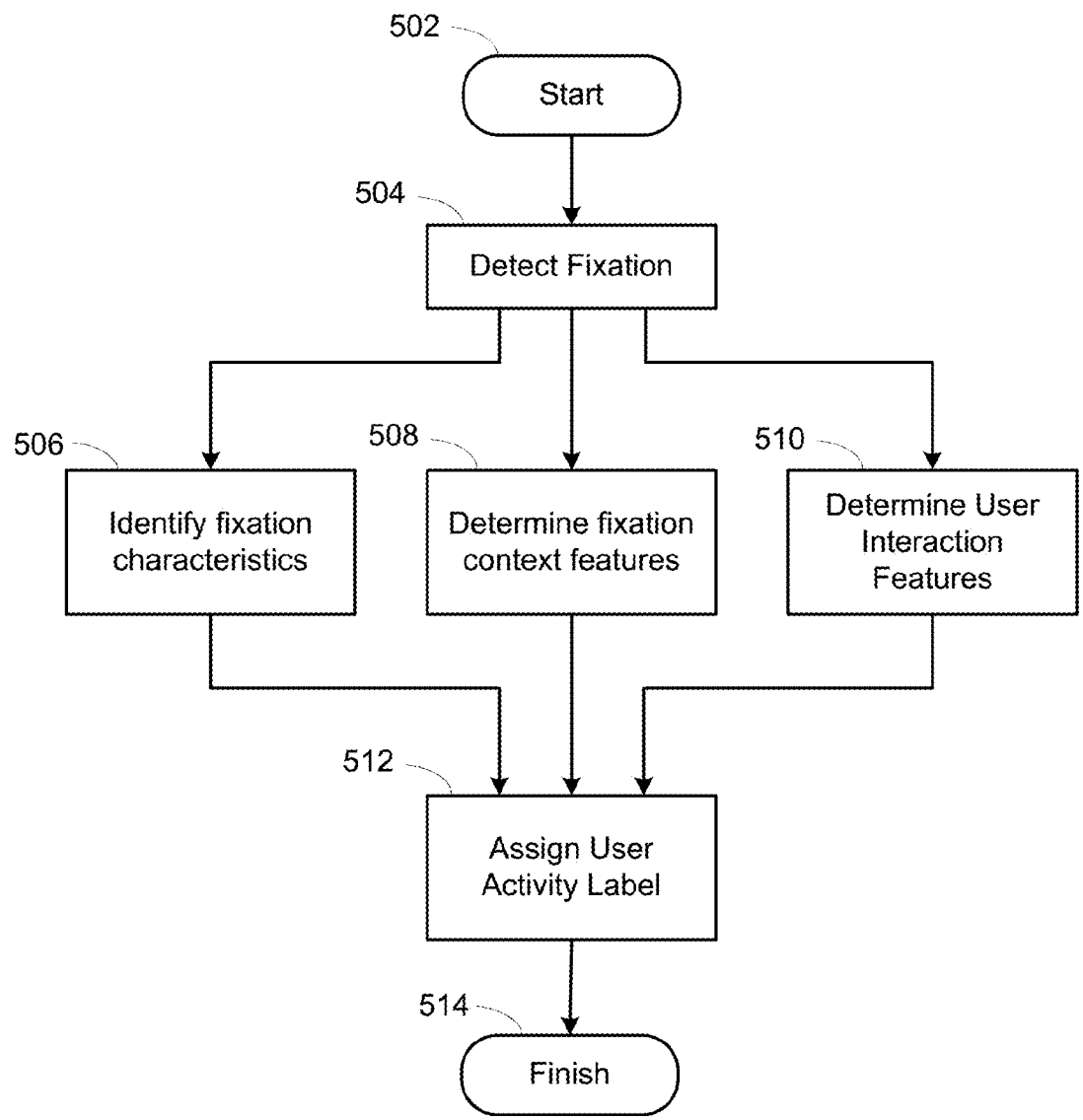
FIG. 5 is a flow chart illustrating how fixations are classified in accordance with some implementations.

FIG. 5 illustrates a process performed by the fixation classification module for classifying individual fixations 214 in accordance with some implementations. The process starts (502) by detecting (504) a fixation 214. The fixation has some basic fixation properties 446, including location and duration. The location is typically specified relative to a page 440 that a user 102 is viewing (e.g., x and y coordinates within the page 440). In some implementations, the properties 446 include a validity measure. In some implementations, the validity measure is binary in nature, with 1 used to identify true fixations and 0 to indicate quasi-fixations. In some implementations, the validity measure has a continuous range (e.g., 0 to 1), which indicates the likelihood that it is a true fixation. In some implementations this is specified as a probability. For each fixation 214, there is a set of fixation features 448, which are measured or computed quantities that relate to the fixation 214. In some implementations, each fixation features 448 is categorized as one of three types: characteristics of the fixation itself; quantities that provide some context based on surrounding fixations; and quantities that indicate the status of various user interface devices during the fixation. Note that this third category is generally not relevant when the page 440 being viewed is a printed page 120. In FIG. 5, the gathering/computing of the features 448 from these three types are shown in parallel (506, 508, and 510), but they could be gathered/computed sequentially.

The fixation classification module 430 identifies (506) a set of fixation characteristics, which are features 448 corresponding to the fixation 214 itself. Some of these characteristics are basic fixation properties, such as the duration of the fixation 214, or the validity of the fixation 214. Other fixation characteristics include the average distance between gaze points 212 corresponding to the fixation 214. Typically the distances between the gaze points are only measured between sequentially consecutive gaze points. Some implementations also include the variance in the distance between the gaze points. Another fixation characteristic is the variance in pupil size measured during the fixation. Some implementations utilize a subset of these characteristics, or supplement with additional fixation characteristics, such as the width or spread of the fixation.

The fixation classification module 430 determines (508) a plurality of fixation context features, which may include any of the following, or variations thereof:
  the distance from the fixation 214 to the immediately preceding fixation;
  the distance from the fixation 214 to the immediately following fixation;
  the duration of the immediately preceding fixation;
  the duration of the immediately following fixation;
  the average distance between successive fixations for the previous five fixations;
  the variance in the distances between successive fixations for the previous five fixations;
  the average distance between successive fixations for the subsequent five fixations;
  the variance in the distances between successive fixations for the subsequent five fixations;
  the minimum distance between successive fixations for the previous five fixations;
  the maximum distance between successive fixations for the previous five fixations;
  the minimum distance between successive fixations for the subsequent five fixations; and
  the maximum distance between successive fixations for the subsequent five fixations.

These features 448 illustrate various measurable factors about preceding or subsequent fixations that may assist in classifying the fixation 214.

The fixation classification module 430 also determines (510) a set of user interaction features 448 based on the status of user interface devices during the fixation 214, or in close temporal proximity to the fixation 214. The user interface devices typically include the input devices 410 of the computing device 400, such as a keyboard and mouse. There are many user interaction features 448 that can be used, including various subsets of:
  the speed of the mouse cursor during the fixation;
  the average distance of the mouse cursor to the fixation during the fixation;
  the variance in the distance from the mouse cursor to the fixation during the fixation;
  the minimum distance between the mouse cursor and the fixation during the fixation;
  the maximum distance between the mouse cursor and the fixation during the fixation;
  the average distance from the mouse cursor to each gaze point within a fixation, where the location of the cursor is identified at the same point in time as each gaze point is measured;
  distance between mouse cursor location at the time of the closest temporal mouse event before the fixation and the location of the fixation;
  distance between mouse cursor location at the time of the closest temporal mouse event after the fixation and the location of the fixation;
  whether a mouse button was pressed during the fixation;
  whether a mouse button was depressed during the fixation (i.e., the button was pressed before the fixation, but was still depressed during at least part of the fixation);
  whether a mouse button was released during the fixation;
  the length of time between the most recent mouse event and the start of the fixation;
  the length of time between the end of the fixation and the nearest temporal mouse event after the fixation;
  the distance between the mouse cursor at the time of the most recent mouse event and the location of the fixation;
  the distance between the location of the fixation and the location of the next mouse event after the fixation;
  the distance between the location of the fixation (the center) and the mouse cursor at the time of a mouse button press during the fixation;
  typing speed during the fixation;
  number of characters typed during the fixation;
  the average speed of typing during the immediately preceding five fixations; and
  the average speed of typing during the immediately subsequent five fixations.

One of skill in the art recognizes that the above list of user interaction features 448 is not exhaustive. The list illustrates various features that measure user interactions that are potentially relevant to classifying the fixation 214. One of skill in the art recognizes a wide array of mouse events, such as CLICK, MOUSEDOWN, and MOUSEUP. Furthermore, some computer mice include left and right buttons, so the features may distinguish between the two types of button presses. In addition, many computer mice include a scroll wheel, so features may be utilized that measure whether the scroll wheel was used during a fixation, the length of the scroll, and so on. In addition, some computing devices utilize a joy stick or other input device, which has a different set of events that may be relevant to classifying a fixation. For example, tracking joystick events together with eye tracking may be useful to evaluate a video game, which is more complex than evaluating a user interface with static (or nearly static) regions. User interaction features may also be derived from gestures detected from a video stream.

Implementations may utilize all or any subset of the features identified above in the three categories of features 448. Furthermore, some implementations select all or a subset of the listed features 448, and supplement with additional features 448 that have not been explicitly listed above.

Once the designated set of fixation features 448 has been identified/determined, the fixation classification module 430 assigns (512) a user activity label 444 to the fixation 214. The assigned user activity label 450 is selected from the predefined set of user activity labels 444.

In some implementations, the assignment of a user activity label 444 to the fixation uses a machine learning algorithm. Using a training set of prior data where the input features are known and the classification of fixations is known, a machine can be trained to classify fixations with relative high accuracy. In some implementations, the machine learning uses a support vector machine (SVM). In some implementations, the machine learning uses a neural network.

In some implementations, the assignment of a user activity label to the fixation uses a deterministic algorithm rather than machine learning. Some implementations that do not use machine learning utilize a smaller number of fixation features 448.

Figure 6:
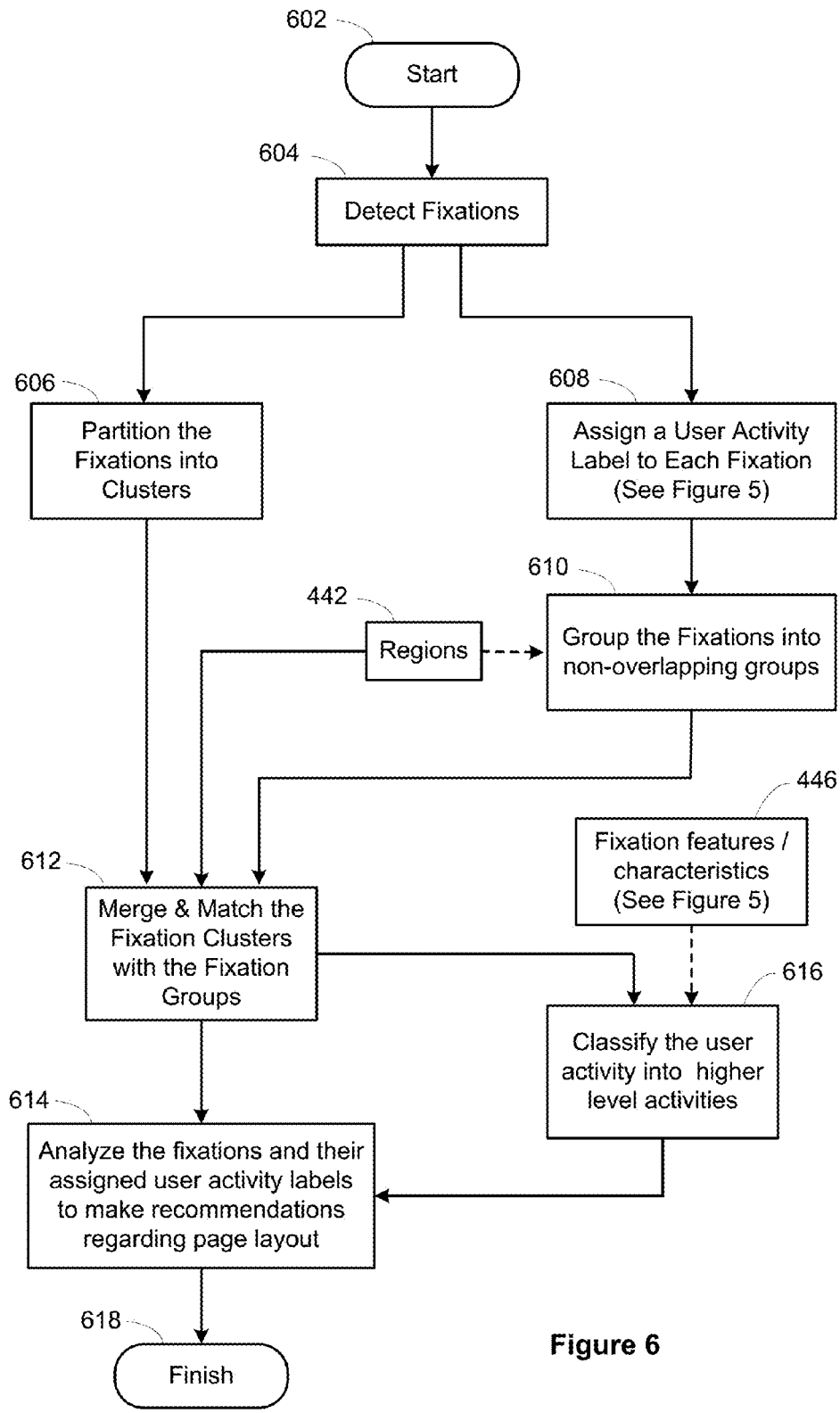
FIG. 6 illustrates a process for classifying fixations and grouping fixations together in accordance with some implementations.
Figure 8A:
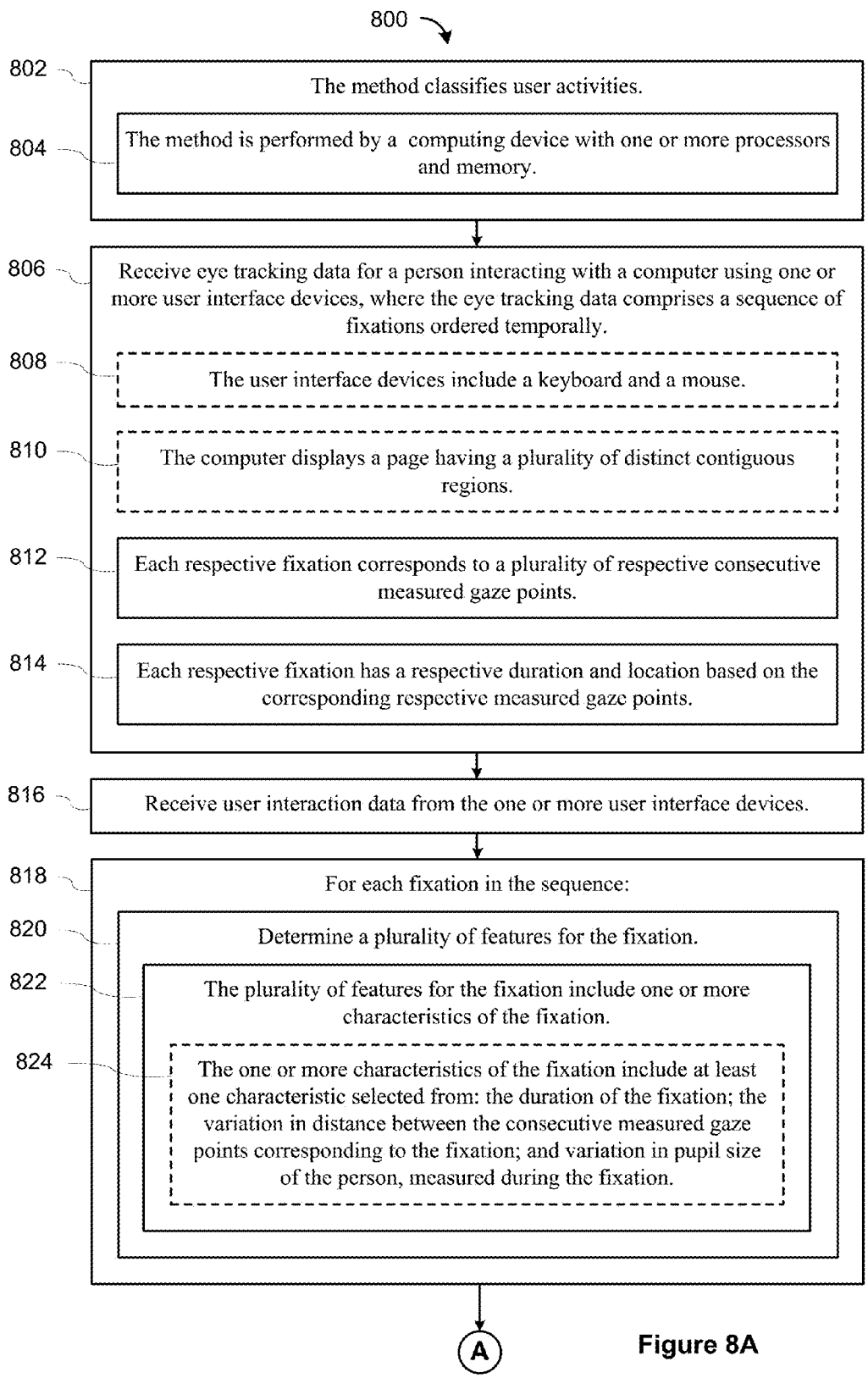
Figure 8B:
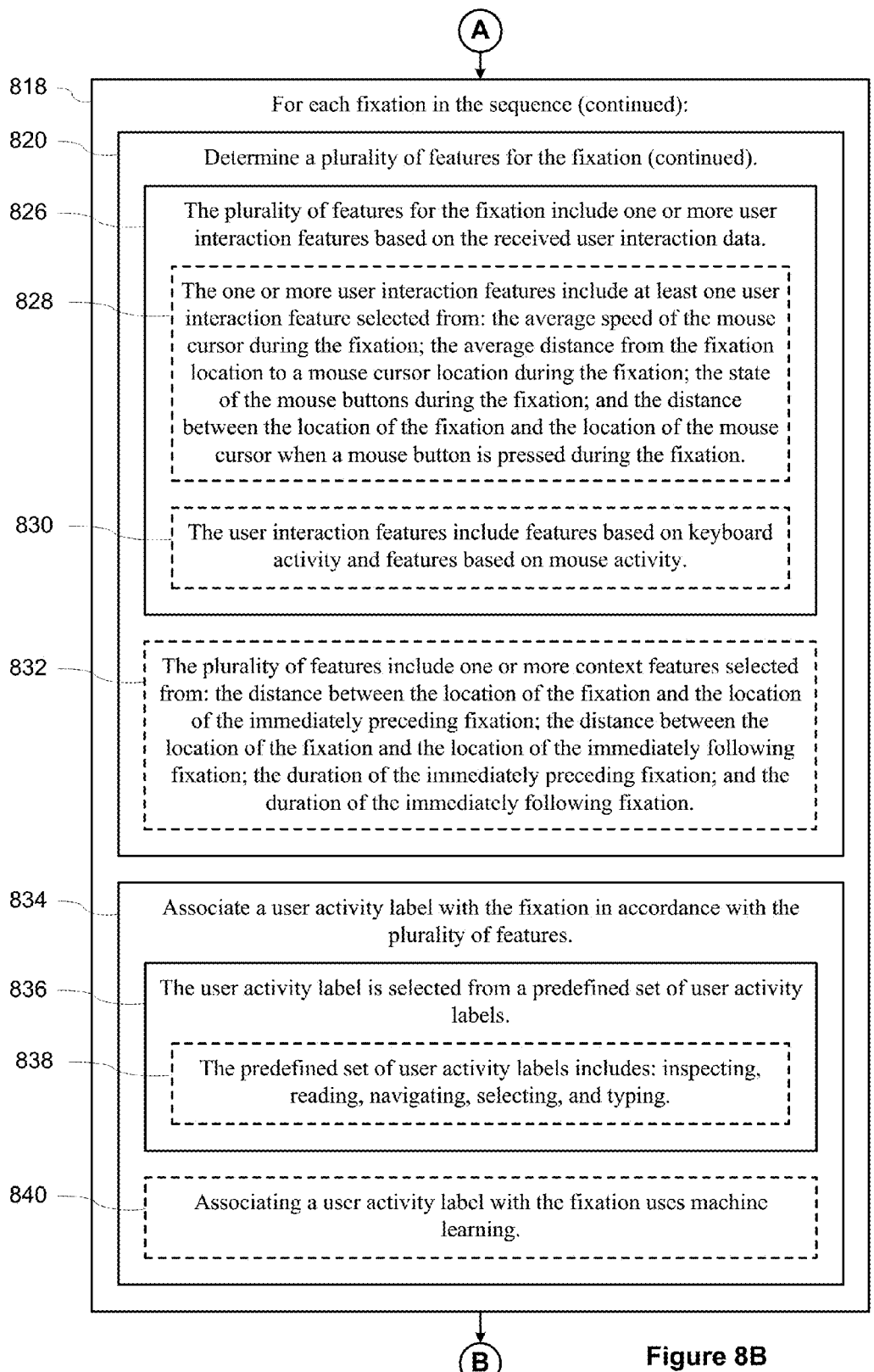
Figure 8C:
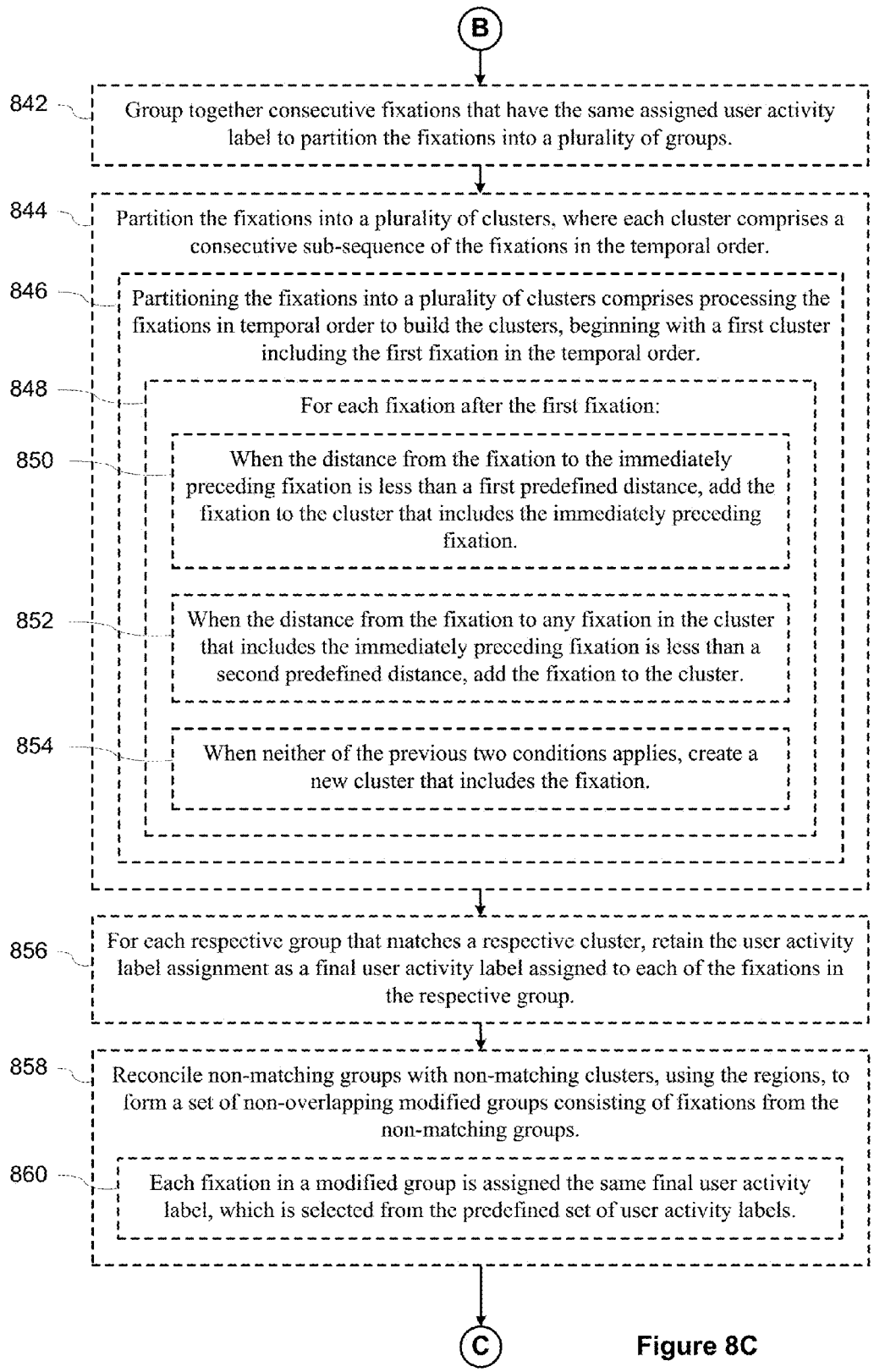

The process flow shown in FIG. 5 illustrates the classification of a single fixation 214, so once a user activity label 444 has been assigned (512) to the fixation 214, the process is finished (514). The basic process illustrated in FIG. 5 is typically applied to many fixations, as illustrated in FIG. 6 below. The details of the classification process based on fixation features will not be repeated.

FIG. 6 illustrates a process for classifying fixations 214, but expands the method of FIG. 5 to a two-pronged approach. The process starts (602) by detecting (604) a sequence of fixations. As noted previously, the process of detecting fixations can utilize many known algorithms. In some implementations, a known algorithm is extended to provide a validity measure with each fixation. As illustrated in FIG. 5, the fixation classification module 430 assigns (608) a user activity label to each fixation 214, using fixation features 448 associated with each fixation 214.

Once the user activity labels 444 have been assigned to each fixation 214, the fixation classification module 430 groups (610) the fixations 214 into a sequence of non-overlapping groups based on the assigned user activity labels 450. In some implementations, the grouping is based simply on whether consecutive fixations have the same assigned user activity label 450: if they are the same, then the fixations 214 are in the same group; if they are different, then they are in different groups. This process creates a partition of the fixations, in which each fixation is in exactly one group, and the fixations within each group are temporally contiguous. In some implementations, the grouping also takes into account whether the fixations are located in the same region 442 of the page 440 being viewed. In these implementations, two consecutive fixations are placed in the same group only if the assigned user activity labels are the same and the two fixations are in the same region 442. Otherwise, the fixations are in different groups. This process results in a partition of the fixations, but there may be a greater number of groups than implementations that do not consider the regions when grouping fixations together.

As a separate independent step, the fixation clustering module 432 partitions (606) the set of fixations 214 into clusters 454. In some implementations, the clusters 454 are formed by sequentially processing the fixations 214 in temporal order. As an initial step, the first fixation 214 is considered a first cluster 454. For each subsequent fixation 214, it is either added to the preceding cluster 454 that includes the preceding fixation 214, or starts a new cluster 454. In some implementations, the next fixation 214 is added to the preceding cluster 454 if the distance from the subsequent fixation 214 to the immediately preceding fixation is less than a threshold value. This accounts for the fact that reading typically proceeds from left to right, and all fixations while reading one segment of text should be clustered together. In other implementations, the subsequent fixation 214 is added to the preceding cluster 454 when the subsequent fixation 214 is within a threshold distance of any fixation within the preceding cluster 454.

Some implementations combine these two ideas to determine whether to add the subsequent fixation 214 to the preceding cluster 454. First, if the subsequent fixation 214 is within a first threshold distance of the immediately preceding fixation, then the subsequent fixation 214 is added to the preceding cluster 454. If not added to the preceding cluster based on the first calculation, the fixation clustering module 432 computes the shortest distance between the subsequent fixation 214 and any fixation in the preceding cluster 454. If that shortest distance is less than a second threshold distance, then the subsequent fixation 214 is added to the preceding cluster 454. If the subsequent fixation 214 is not added to the preceding cluster 454 based on either of these two steps, then a new cluster is started, which initially consists of just the subsequent fixation.

This process continues through the entire set of fixations in sequence. Note that for each fixation, there is only one cluster to consider. Clusters consist of temporally consecutive fixations, so each fixation is either added to the immediately preceding cluster, or starts a new cluster. Of course this process results in each fixation being in exactly one cluster, so the clusters form a partition of the fixations.

After the fixation groups 452 and fixation clusters 454 are determined, the merge & match module 434 compares (612) the clusters 454 with the groups 452 in the context of the regions 442 to form a final set of groups. When a cluster 454 exactly matches a group 452, the group is not modified, and each fixation in the group keeps its assigned user activity label 450.

For the unmatched groups and unmatched clusters, the merge & match module reconciles the differences. FIGS. 7A and 7B illustrate two examples of this process. In FIG. 7A, cluster number 13 coincides with the single region labeled Text 1-1. However, for the fixation corresponding to row 702, the fixation was originally assigned user activity label "navigating" 704. There are multiple reasons to conclude that the assigned user activity label 704 is incorrect. Not only does the cluster coincide with the region, the assigned user activity labels before and after row 702 identify the activity as "reading." In addition, there is only one fixation with the "navigating" label 450. Therefore, the merge & match module 434, reclassifies the fixation corresponding to row 702 as "reading" 706.

In FIG. 7B, there is a long cluster number 23. Based on the regions associated with the fixations in the cluster (Text 1-5, Link 1-5, and Text 1-6), and the assigned user activity labels ("reading" for the region Text 1-5, "selecting" for the region Link 1-5, and "navigating" for the region Text 1-6, the merge & match module 434 splits cluster number 23 into three clusters that correspond to the regions and assigned user activity labels. For rows 730 and 732, the merge & match module 434 changes the cluster assignments 710 (cluster no. 23) to a new cluster 712 (cluster no. 23.1). In addition, for row 734, the merge & match module 434 changes the cluster assignment 714 (cluster no. 23) to a new cluster 716 (cluster no. 23.2). This example also shows that clusters and groups can consist of a single fixation (e.g., the fixation corresponding to row 734).

In some implementations, the merge & match module 434 processes the non-matching borders of the fixation groups 452 and fixation clusters 454. This is illustrated in FIGS. 7C and 7D, which present the same fixation clusters and fixation groups as shown in FIGS. 7A and 7B. For example, in FIG. 7C, the clusters 454 and groups 452 agree that there are borders at 750 and 756, even though the clusters 454 and groups 452 are different. The question is whether to retain or remove the non-matching borders 752 and 754, which are borders for groups but not clusters. In some implementations, the decision to keep or remove one of the non-matching borders (e.g., 752 and/or 754) uses a cost/benefit function based on a plurality of factors. For border 752, maintaining the computed groups is a benefit, but keeping the border would require both splitting a cluster and splitting a region. In the cost/benefit analysis, it is better to discard the borders 752 and 754, as indicated previously with respect to FIG. 7A.

In FIG. 7D, the clusters 454 and groups 452 agree on borders 760 and 766, but borders 762 and 764 do not match. In this case, the regions where the fixations are located weigh in favor of keeping the borders 762 and 764, as described above with respect to FIG. 7B. Additional factors may be included in the cost/benefit analysis, such as the proximity of the regions involved, the number of fixations that will be in each group based on keeping or discarding a unmatched border (e.g., preference for groups that are neither too large nor too small), and the identified user activity labels in the proximity of the border.

During the reconciliation process, some of the assigned user activity labels 450 may change. When a fixation group 452 is unchanged by the merge & match module 434, the assigned user activity label 450 for each fixation 214 within the group 452 is retained. For example, in FIG. 7B, the clusters 454 are changed to match the fixation groups 452. Because none of the fixation groups is changed, all of the assigned user activity labels 450 stay the same. When fixation groups are modified, the assigned user activity labels may change for some of the fixations. This is illustrated in FIG. 7A, where the groups are changed, and the label assigned to the fixation at row 702 is changed from "navigating" 704 to "reading" 706. In some implementations, the assignment of user activity labels within a modified group is based on a "majority vote" of the previously assigned user activity labels. For example, in FIG. 7A, the modified group has seven fixations in which six of the fixations are assigned the user activity label "reading." Therefore, the seventh fixation, at row 702, is assigned the "reading" 706 user activity label.

Returning to FIG. 6, after the merge & match module reconciles the groups 452 with the clusters 454, the fixations and their assigned user activity labels are analyzed (614) to make recommendations. In some implementations, the recommendations relate to (614) the layout of the page. In some implementations, the recommendations are for the user, and are provided in close to real-time. For example, the eye tracking analysis may show that the user is not optimally using a computer user interface, and thus instruct the user on what to do.

In some implementations, after the merge & match module reconciles the groups 452 with the clusters 454, the activity sequencing module 436 classifies (616) the user activity into higher level activities. Whereas the fixation classification module 430 assigns a user activity label 444 to each fixation individually, the activity sequencing module 436 identifies patterns of lower level activity that can be classified at a higher level. For example, some implementations can differentiate between when a user is reading for content versus skimming based on different patterns of eye movement. In some implementations, the activity classification module 436 uses one or more of the fixation features 446 in the analysis. In some implementations, the activity sequencing module 436 utilizes the regions 442 in the analysis. In some implementations, the database 438 stores a set of user activity patterns, which the activity sequencing module compares to the user activity. In some implementations, previous activity patterns are used as input to a machine learning algorithm, and the activity sequencing module 436 uses the trained machine to classify the high level activities.

FIGS. 8A-8D are a flow diagram 800 for classifying (802) eye fixations according to some implementations. The process is performed (804) by a computing device 400 with one or more processors and memory. The computing device 400 receives (806) eye tracking data for a person interacting with the computer 400 using one or more user interface devices (e.g., input device 410). The eye tracking data comprises (806) a sequence of fixations ordered temporally. The fixations 214 are determined from a sequence of raw gaze points 212 using a fixation detection module 428, as described above with respect to FIGS. 2C, 2D, and 4. In some implementations, the user interface devices include (808) a keyboard and a mouse. In some implementations, the computer 400 displays a page having a plurality of distinct contiguous regions, as illustrated above in FIG. 3.

Each respective fixation corresponds to (812) a plurality of respective consecutive measured gaze points, as illustrated above with respect to FIGS. 2C, 2D, and 4. When the fixation detection module 428 detects a fixation 214, the detection module 428 assigns (814) a respective duration and location to the fixation 214 based on the corresponding respective measured gaze points 212. Because the gaze points in a fixation are consecutive in time, some implementations determine the duration as the difference in time between the first and last gaze points in the fixation. In some implementations, the location of a fixation is the centroid.

The computing device 400 also receives (816) user interaction data from the one or more user interface devices. The user interaction for an interface device event typically includes both the time of the event and what the event is (e.g., mouse movement). For events that have a duration (e.g., mouse movement or mouse scroll), the duration is typically included in the interaction data as well.

For each fixation in the sequence (818), the fixation classification module 430 determines (820) a plurality of features for the fixation. In this context, a "feature" is a well defined property corresponding to the fixation, and can be measured quantitatively. As described above with respect to FIG. 5, the features fall into three general categories: features that are direct characteristics of the fixation itself, features that that provide information about the context of the fixation, and features based on user interactions with the computing device (e.g., keyboard and mouse activity).

The plurality of features for the fixation include (822) one or more characteristics of the fixation. In some implementations, the one or more characteristics of the fixation include (824) at least one characteristic selected from: the duration of the fixation; the variation in distance between the consecutive measured gaze points corresponding to the fixation; and variation in pupil size of the person, measured during the fixation.

The plurality of features for the fixation also include (826) one or more user interaction features based on the received user interaction data. In some implementations, the one or more user interaction features include (828) at least one user interaction feature selected from: the average speed of the mouse cursor during the fixation; the average distance from the fixation location to a mouse cursor location during the fixation; the state of the mouse buttons during the fixation; and the distance between the location of the fixation and the location of the mouse cursor when a mouse button is pressed during the fixation. This is described above in more detail with respect to FIG. 5, including a larger list of user interaction features that some implementations use. In some implementations, the user interaction features include (830) both features based on keyboard activity and features based on mouse activity.

In some implementations, the plurality of features include (832) one or more context features selected from: the distance between the location of the fixation and the location of the immediately preceding fixation; the distance between the location of the fixation and the location of the immediately following fixation; the duration of the immediately preceding fixation; and the duration of the immediately following fixation. A more extensive illustrative list of context features is provided above with respect to FIG. 5.

Using the plurality of features, the fixation classification module 430 associates (834) a user activity label with the fixation. The user activity label is selected (836) from a predefined set of user activity labels. The list is typically small (e.g., less than 10 labels) because the labels define in a general way how a user is interacting with a computer screen (or in other implementations, a printed page). For example, in some implementations, the predefined set of user activity labels includes: inspecting, reading, navigating, selecting, and typing.

In some implementations, associating a user activity label with the fixation uses (840) machine learning, such as a support vector machine or a neural network. These implementations select a set of features (e.g., forty features of the three types identified above), with each of these features corresponding to a component in a feature vector (e.g., with forty components). Based on a training set, where both the features and the user activity is known, the machine learns how to correlate the features with specific user activities.

In some implementations, consecutive fixations that have the same assigned user activity label are grouped together (842), thus partitioning the fixations into a plurality of groups.

In some implementations, the fixations are also partitioned (844) into a plurality of clusters using a second independent technique. This is described in detail above with respect to FIG. 6. Each cluster comprises (844) a consecutive sub-sequence of the fixations in the temporal order. In some implementations, partitioning the fixations into a plurality of clusters comprises (846) processing the fixations in temporal order to build the clusters, beginning with a first cluster including the first fixation in the temporal order. The clustering algorithm typically does not utilize the user activity labels or the features that were used to assign the user activity labels.

In some implementations, for each fixation after the first fixation (848), the fixation is either added to the previous cluster or begins a new cluster based on a set of three rules. When the distance from the fixation to the immediately preceding fixation is less than a first predefined distance, add (850) the fixation to the cluster that includes the immediately preceding fixation. When the distance from the fixation to any fixation in the cluster that includes the immediately preceding fixation is less than a second predefined distance, add (852) the fixation to the cluster. When neither of the previous two conditions applies, create (854) a new cluster that includes the fixation. In some implementations, the first and second predefined distances are the same, in which case the first two rules collapse into a single rule. However, because the fixation is more likely to be close to the immediately preceding fixation, the clustering algorithm typically evaluates the distance to the immediately preceding fixation first for performance reasons (when any of the distances are under the threshold, there is no need to compute any of the other distances).

The grouping of fixations based on user activity labels and the clustering based on the proximity of fixations form two distinct partitions of the fixations. In many instances, groups and clusters match each other, which increase the likelihood that the classifications are correct. However, for mismatched groups and clusters, a reconciliation process is performed by the Merge & Match module 434. This is described in detail above with respect to FIGS. 6 and 7A-7D.

In some implementations, for each respective group that matches a respective cluster, the user activity label assignment for the respective group is retained (856) as a final user activity label assigned to each of the fixations in the respective group. Some implementations reconcile (858) non-matching groups with non-matching clusters, using the regions, to form a set of non-overlapping modified groups consisting of fixations from the non-matching groups. In some implementations, each fixation in a modified group is assigned (860) the same final user activity label (i.e., all of the fixations within a modified group have the same label as each other). The user activity label is selected (860) from the predefined set of user activity labels (i.e., there is one predefined set of labels, and that predefined set is used by both the fixation classification module 430 and the merge & match module 434).

In some implementations, reconciling (858) non-matching groups with non-matching clusters comprises (862) identifying (864) a set of non-matching boundaries. Each boundary in the set of non-matching boundaries is (866) either a boundary of a respective group but not a boundary of any respective cluster or a boundary of a respective cluster but not a boundary of any respective group. For each boundary in the set of non-matching boundaries, the merge & match module 434 computes (870) a respective retention cost for keeping the boundary and computes (870) a respective removal cost for removing the boundary. In some implementations, boundary retention costs and boundary removal costs are (872) based on a plurality of factors selected from: the sizes of resulting modified groups; fixation durations within resulting modified groups; the user activity labels assigned to fixations on both sides of a boundary; regions corresponding to fixations on both sides of a boundary; and the sizes of the regions. The merge & match module 434 then keeps (874) or removes (874) the boundary based on the lowest cost alternative. This process is described in detail above with respect to FIGS. 6 and 7A-7D.

Once all of the non-matching boundaries are processing, the merge & match module 434 identifies (876) the set of modified groups based on the boundaries kept from the set of non-matching boundaries. In some implementations, a final user activity label is assigned (878) to the fixations in each modified group based on the most prevalent user activity label previously assigned to the fixations in the respective modified group (i.e., a majority rule algorithm).

In some implementations, the fixations and their associated user activity labels are analyzed (880) to make one or more recommendations for modifying the computer user interface.

Although the disclosed clustering and grouping techniques may be applied independently and subsequently reconciled as described above with respect to FIGS. 6, 7A-7D, and 8A-8D, one of skill in the art recognizes that the two techniques can be integrated in other ways. For example, the disclosed clustering algorithm could be modified to utilize the regions and user activity labels as it determines whether to add the next fixation to the existing cluster. As another example, the clustering algorithm could be applied first, and the clustering and region information could be included in the set of features that are used to classify each of the fixations.

In some implementations, an alternative method of classifying user activities comprises: at a computer system having one or more processors and memory: receiving eye tracking data for a person viewing a page having a plurality of distinct contiguous regions, the eye tracking data comprising a sequence of fixations ordered temporally, wherein each respective fixation corresponds to a plurality of respective measured gaze points, and wherein each respective fixation has a respective duration and location based on the corresponding respective measured gaze points; partitioning the fixations into a plurality of clusters, wherein each cluster comprises a consecutive sub-sequence of the fixations in the temporal order; assigning a provisional user activity label to each fixation based on a set of characteristics of the fixation, wherein the user activity labels are selected from a predefined set of user activity labels; grouping together consecutive fixations that have the same assigned provisional user activity label to partition the fixations into a plurality of groups; for each respective group that matches a respective cluster, retaining the provisional user activity label assignment as a final user activity label assigned to each of the fixations in the respective group; and reconciling non-matching groups with non-matching clusters, using the regions, to form a set of non-overlapping modified groups consisting of fixations from the non-matching groups, wherein each fixation in a modified group is assigned a same final user activity label selected from the predefined set of user activity labels.

In some implementations, partitioning the fixations into a plurality of clusters comprises processing the fixations in temporal order to build the clusters, beginning with a first cluster including the first fixation in the temporal order, wherein for each fixation after the first fixation: when the distance from the fixation to an immediately preceding fixation is less than a first predefined distance, adding the fixation to the cluster that includes the immediately preceding fixation; when the distance from the fixation to any fixation in the cluster that includes the immediately preceding fixation is less than a second predefined distance, adding the fixation to the cluster; and when neither of the preceding two conditions applies, creating a new cluster that includes the fixation.

In some implementations, assigning a provisional user activity label to each fixation uses machine learning.

In some implementations, reconciling non-matching groups with non-matching clusters comprises: identifying a set of non-matching boundaries, wherein each boundary in the set of non-matching boundaries is either a boundary of a respective group but not a boundary of any respective cluster or a boundary of a respective cluster but not a boundary of any respective group; for each boundary in the set of non-matching boundaries: computing a respective retention cost for keeping the boundary; computing a respective removal cost for removing the boundary; and keeping or removing the boundary based on selecting the lowest cost alternative; identifying the set of modified groups based on the boundaries kept from the set of non-matching boundaries; and assigning a final user activity label to the fixations in each modified group based on the most prevalent provisional user activity label assigned to the fixations in the respective modified group.

In some implementations, boundary retention costs and boundary removal costs are based on a plurality of factors selected from the group consisting of: sizes of resulting modified groups; fixation durations within resulting modified groups; user activity labels assigned to fixations on both sides of a boundary; regions corresponding to fixations on both sides of a boundary; and sizes of the regions.

In some implementations, the page is a printed page.

In some implementations, the page is a window in a computer user interface.

In some implementations, the method of classifying user activities further comprises analyzing the fixations and their associated user activity labels to make one or more recommendations for modifying contents of the page.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of classifying user activities, comprising:
at a computer system having one or more processors and memory:
receiving eye tracking data for a person viewing a page having a plurality of distinct contiguous regions, the eye tracking data comprising a sequence of fixations ordered temporally, wherein each respective fixation corresponds to a plurality of respective measured gaze points, and wherein each respective fixation has a respective duration and location based on the corresponding respective measured gaze points;
partitioning the fixations into a plurality of clusters, wherein each cluster comprises a consecutive sub-sequence of the fixations in the temporal order;
assigning a provisional user activity label to each fixation based on a set of characteristics of the fixation, wherein the user activity labels are selected from a predefined set of user activity labels;
grouping together consecutive fixations that have the same assigned provisional user activity label to partition the fixations into a plurality of groups;
for each respective group that matches a respective cluster, retaining the provisional user activity label assignment as a final user activity label assigned to each of the fixations in the respective group; and
reconciling non-matching groups with non-matching clusters, using the regions, to form a set of non-overlapping modified groups consisting of fixations from the non-matching groups, wherein each fixation in a modified group is assigned a same final user activity label selected from the predefined set of user activity labels.

2. The method of claim 1, wherein partitioning the fixations into a plurality of clusters comprises processing the fixations in temporal order to build the clusters, beginning with a first cluster including the first fixation in the temporal order, wherein for each fixation after the first fixation:

when the distance from the fixation to an immediately preceding fixation is less than a first predefined distance, adding the fixation to the cluster that includes the immediately preceding fixation;

when the distance from the fixation to any fixation in the cluster that includes the immediately preceding fixation is less than a second predefined distance, adding the fixation to the cluster; and when neither of the preceding two conditions applies, creating a new cluster that includes the fixation.

3. The method of claim 1, wherein assigning a provisional user activity label to each fixation uses machine learning.

4. The method of claim 1, wherein reconciling non-matching groups with non-matching clusters comprises:

identifying a set of non-matching boundaries, wherein each boundary in the set of non-matching boundaries is either a boundary of a respective group but not a boundary of any respective cluster or a boundary of a respective cluster but not a boundary of any respective group;

for each boundary in the set of non-matching boundaries:
computing a respective retention cost for keeping the boundary;
computing a respective removal cost for removing the boundary; and
keeping or removing the boundary based on selecting the lowest cost alternative;

identifying the set of modified groups based on the boundaries kept from the set of non-matching boundaries; and assigning a final user activity label to the fixations in each modified group based on the most prevalent provisional user activity label assigned to the fixations in the respective modified group.

5. The method of claim 4, wherein boundary retention costs and boundary removal costs are based on a plurality of factors selected from the group consisting of:

sizes of resulting modified groups;
fixation durations within resulting modified groups;
user activity labels assigned to fixations on both sides of a boundary;
regions corresponding to fixations on both sides of a boundary; and
sizes of the regions.

6. The method of claim 1, wherein the page is a printed page.

7. The method of claim 1, wherein the page is a window in a computer user interface.

8. The method of claim 1, further comprising analyzing the fixations and their associated user activity labels to make one or more recommendations for modifying contents of the page.

9. A computer system for classifying user activities, comprising:

one or more processors;
memory; and
one or more programs stored in the memory, the one or more programs comprising instructions for:

receiving eye tracking data for a person viewing a page having a plurality of distinct contiguous regions, the eye tracking data comprising a sequence of fixations ordered temporally, wherein each respective fixation corresponds to a plurality of respective measured gaze points, and wherein each respective fixation has a respective duration and location based on the corresponding respective measured gaze points;

partitioning the fixations into a plurality of clusters, wherein each cluster comprises a consecutive subsequence of the fixations in the temporal order;

assigning a provisional user activity label to each fixation based on a set of characteristics of the fixation, wherein the user activity labels are selected from a predefined set of user activity labels;

grouping together consecutive fixations that have the same assigned provisional user activity label to partition the fixations into a plurality of groups;

for each respective group that matches a respective cluster, retaining the provisional user activity label assignment as a final user activity label assigned to each of the fixations in the respective group; and reconciling non-matching groups with non-matching clusters, using the regions, to form a set of non-overlapping modified groups consisting of fixations from the non-matching groups, wherein each fixation in a modified group is assigned a same final user activity label selected from the predefined set of user activity labels.

10. The computer system of claim 9, wherein the instructions for partitioning the fixations into a plurality of clusters comprise instructions for processing the fixations in temporal order to build the clusters, beginning with a first cluster including the first fixation in the temporal order, wherein for each fixation after the first fixation:

when the distance from the fixation to an immediately preceding fixation is less than a first predefined distance, adding the fixation to the cluster that includes the immediately preceding fixation;

when the distance from the fixation to any fixation in the cluster that includes the immediately preceding fixation is less than a second predefined distance, adding the fixation to the cluster; and when neither of the preceding two conditions applies, creating a new cluster that includes the fixation.

11. The computer system of claim 9, wherein the instructions for reconciling non-matching groups with non-matching clusters comprise instructions for:

identifying a set of non-matching boundaries, wherein each boundary in the set of non-matching boundaries is either a boundary of a respective group but not a boundary of any respective cluster or a boundary of a respective cluster but not a boundary of any respective group;

for each boundary in the set of non-matching boundaries:
computing a respective retention cost for keeping the boundary;
computing a respective removal cost for removing the boundary; and
keeping or removing the boundary based on selecting the lowest cost alternative;

identifying the set of modified groups based on the boundaries kept from the set of non-matching boundaries; and assigning a final user activity label to the fixations in each modified group based on the most prevalent provisional user activity label assigned to the fixations in the respective modified group.

12. The computer system of claim 11, wherein boundary retention costs and boundary removal costs are based on a plurality of factors selected from the group consisting of:

sizes of resulting modified groups;
fixation durations within resulting modified groups;
user activity labels assigned to fixations on both sides of a boundary;
regions corresponding to fixations on both sides of a boundary; and
sizes of the regions.

13. The computer system of claim 9, wherein the page is a printed page.

14. The computer system of claim 9, wherein the page is a window in a computer user interface.

15. A non-transitory computer readable storage medium storing one or more programs configured for execution by a computer, the one or more programs comprising instructions for:
  receiving eye tracking data for a person viewing a page having a plurality of distinct contiguous regions, the eye tracking data comprising a sequence of fixations ordered temporally, wherein each respective fixation corresponds to a plurality of respective measured gaze points, and wherein each respective fixation has a respective duration and location based on the corresponding respective measured gaze points;
  partitioning the fixations into a plurality of clusters, wherein each cluster comprises a consecutive sub-sequence of the fixations in the temporal order;
  assigning a provisional user activity label to each fixation based on a set of characteristics of the fixation, wherein the user activity labels are selected from a predefined set of user activity labels;
  grouping together consecutive fixations that have the same assigned provisional user activity label to partition the fixations into a plurality of groups;
  for each respective group that matches a respective cluster, retaining the provisional user activity label assignment as a final user activity label assigned to each of the fixations in the respective group; and
  reconciling non-matching groups with non-matching clusters, using the regions, to form a set of non-overlapping modified groups consisting of fixations from the non-matching groups, wherein each fixation in a modified group is assigned a same final user activity label selected from the predefined set of user activity labels.

16. The computer readable storage medium of claim 15, wherein partitioning the fixations into a plurality of clusters comprises processing the fixations in temporal order to build the clusters, beginning with a first cluster including the first fixation in the temporal order, wherein for each fixation after the first fixation:
  when the distance from the fixation to an immediately preceding fixation is less than a first predefined distance, adding the fixation to the cluster that includes the immediately preceding fixation;
  when the distance from the fixation to any fixation in the cluster that includes the immediately preceding fixation is less than a second predefined distance, adding the fixation to the cluster; and
  when neither of the preceding two conditions applies, creating a new cluster that includes the fixation.

17. The computer readable storage medium of claim 15, wherein reconciling non-matching groups with non-matching clusters comprises:
  identifying a set of non-matching boundaries, wherein each boundary in the set of non-matching boundaries is either a boundary of a respective group but not a boundary of any respective cluster or a boundary of a respective cluster but not a boundary of any respective group;
  for each boundary in the set of non-matching boundaries:
    computing a respective retention cost for keeping the boundary;
    computing a respective removal cost for removing the boundary; and
    keeping or removing the boundary based on selecting the lowest cost alternative;
  identifying the set of modified groups based on the boundaries kept from the set of non-matching boundaries; and
  assigning a final user activity label to the fixations in each modified group based on the most prevalent provisional user activity label assigned to the fixations in the respective modified group.

18. The computer readable storage medium of claim 17, wherein boundary retention costs and boundary removal costs are based on a plurality of factors selected from the group consisting of:
  sizes of resulting modified groups;
  fixation durations within resulting modified groups;
  user activity labels assigned to fixations on both sides of a boundary;
  regions corresponding to fixations on both sides of a boundary; and
  sizes of the regions.

19. The computer readable storage medium of claim 15, wherein the page is a printed page.

20. The computer readable storage medium of claim 15, wherein the page is a window in a computer user interface.

* * * * *